US009951532B2

(12) United States Patent
Zimmer et al.

(10) Patent No.: US 9,951,532 B2
(45) Date of Patent: Apr. 24, 2018

(54) INSTALLATION ADJUSTMENT DEVICE FOR AN AUTO-RETURN ARRANGEMENT

(71) Applicants: Guenther Zimmer, Rheinau (DE); Martin Zimmer, Rheinau (DE)

(72) Inventors: Guenther Zimmer, Rheinau (DE); Martin Zimmer, Rheinau (DE)

( * ) Notice: Subject to any disclaimer, the term of this patent is extended or adjusted under 35 U.S.C. 154(b) by 153 days.

(21) Appl. No.: 15/072,061

(22) Filed: Mar. 16, 2016

(65) Prior Publication Data

US 2016/0340917 A1 Nov. 24, 2016

(30) Foreign Application Priority Data

Mar. 17, 2015 (DE) ........................ 10 2015 003 429

(51) Int. Cl.

| | |
|---|---|
| ***E04F 21/00*** | (2006.01) |
| ***E05D 11/00*** | (2006.01) |
| ***E05F 1/16*** | (2006.01) |
| ***G01B 5/14*** | (2006.01) |
| ***E05F 5/00*** | (2017.01) |
| ***E05F 5/02*** | (2006.01) |
| *E06B 3/46* | (2006.01) |

(52) U.S. Cl.

CPC ...... *E04F 21/0007* (2013.01); *E05D 11/0009* (2013.01); *E05F 5/003* (2013.01); *E05F 5/027* (2013.01); *E05F 1/16* (2013.01); *E05Y 2600/00* (2013.01); *E05Y 2800/692* (2013.01); *E06B 3/4636* (2013.01)

(58) Field of Classification Search

CPC ...... E04F 21/00; E04F 21/0007; E05D 11/00; E05D 11/0009; E05F 1/16; G01B 3/20; G01B 5/14

USPC ........................... 33/194, 404, 419, 427, 428

See application file for complete search history.

(56) References Cited

U.S. PATENT DOCUMENTS

| | | | | |
|---|---|---|---|---|
| 303,861 A * | 8/1884 | King | G01B 3/56 | 235/61 GM |
| 1,143,478 A * | 6/1915 | Zofness | A41H 3/002 | 33/11 |
| 2,028,052 A * | 1/1936 | Easterly | G01B 3/566 | 33/427 |
| 4,223,445 A * | 9/1980 | Goodland | G01B 3/00 | 33/194 |
| 4,819,403 A * | 4/1989 | Penicaut et al. | B66B 13/303 | 33/194 |
| 5,094,007 A * | 3/1992 | Gordon | E04D 15/025 | 33/646 |

(Continued)

FOREIGN PATENT DOCUMENTS

| | | | |
|---|---|---|---|
| DE | 9113063 U1 * | 3/1992 | E05D 11/0009 |
| EP | 1997978 A2 * | 12/2008 | E04G 21/1841 |

(Continued)

*Primary Examiner* — R. A. Smith

(74) *Attorney, Agent, or Firm* — Klaus J. Bach

(57) ABSTRACT

In an installation adjustment device for an auto-return arrangement which comprises a support rod with a front stop surface and an adjustable slide which is slideably supported on the support rod so as to be stepwise position-adjustable, the slide is provided with an adjustment surface which extends parallel to the stop surface and the normal vectors pointing to the stop surface and the adjustment surface have the same direction, whereby the adjustment of an auto-return arrangement is facilitated.

6 Claims, 3 Drawing Sheets

(56) References Cited

U.S. PATENT DOCUMENTS

| | | | | | |
|---|---|---|---|---|---|
| 5,339,530 | A * | 8/1994 | Wright | G01B 3/566 33/379 |
| 6,282,852 | B1 * | 9/2001 | Walcker | E04F 21/003 144/144.51 |
| 7,596,877 | B2 * | 10/2009 | Basford | G01B 3/566 33/404 |
| 8,251,356 | B2 * | 8/2012 | Eschenburg | E06B 1/60 144/144.1 |
| 9,428,923 | B1 * | 8/2016 | Christner et al. | E04F 21/0015 |
| 9,493,978 | B2 * | 11/2016 | Welyki | E06B 3/5418 |
| 2005/0102816 | A1 | 5/2005 | Ziegmann | |
| 2011/0107651 | A1 | 5/2011 | Ziegmann | |

FOREIGN PATENT DOCUMENTS

| | | | | | |
|---|---|---|---|---|---|
| JP | 2000257338 | A * | 9/2000 | G01B 3/30 |
| WO | WO 9504915 | A1 * | 2/1995 | G01B 3/08 |

* cited by examiner

INSTALLATION ADJUSTMENT DEVICE FOR AN AUTO-RETURN ARRANGEMENT

BACKGROUND OF THE INVENTION

The invention resides an installation adjustment arrangement for an auto-return arrangement.

Auto-return arrangements generally need to be adjusted for example after installation of a sliding door in that the most suitable position of the stationary carrier is determined by trial settings.

It is the object of the present invention to provide a device for the rapid adjustment of the auto-return arrangement.

SUMMARY OF THE INVENTION

In an installation adjustment device includes a support rod with a front-end abutment surface and a slide member which is guided by the support rod so as to be stepwise position adjustable thereon. The slide member comprises an alignment surface which is arranged parallel to the abutment surface, so that the vectors normal to the abutment surface and the alignment surface have the same direction.

The invention will become more readily apparent from the subclaims and the following description of schematically shown exemplary embodiments.

DESCRIPTION OF EXEMPLARY EMBODIMENTS

Figure 1:
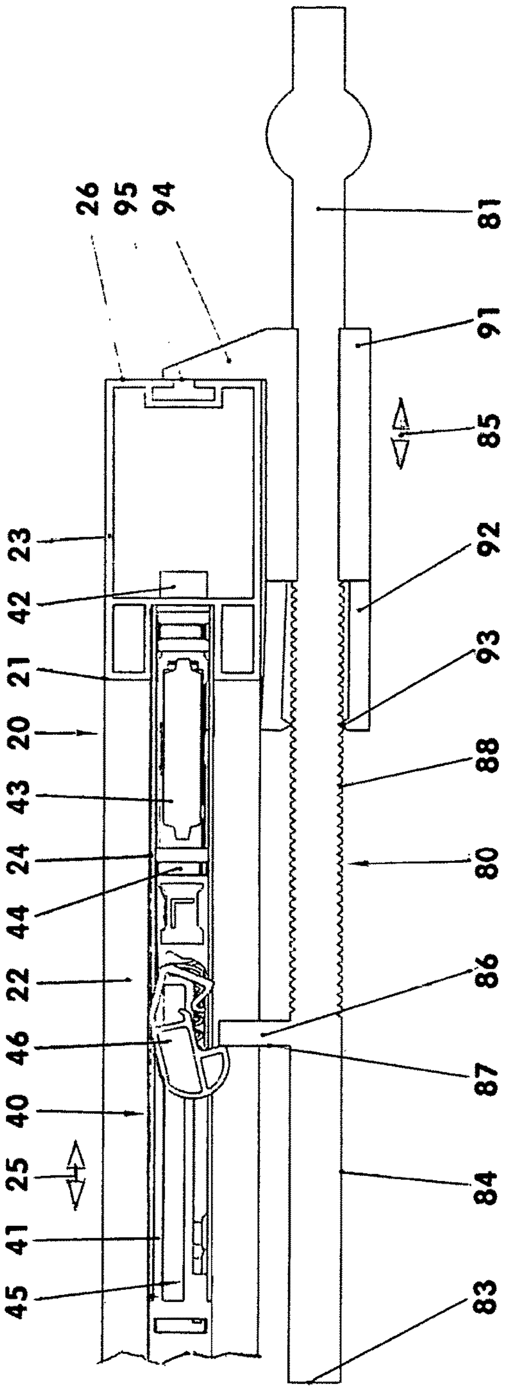
FIG. 1: a bottom view of a sliding door with an acceleration and deceleration device and an installation adjustment device.
Figure 2:
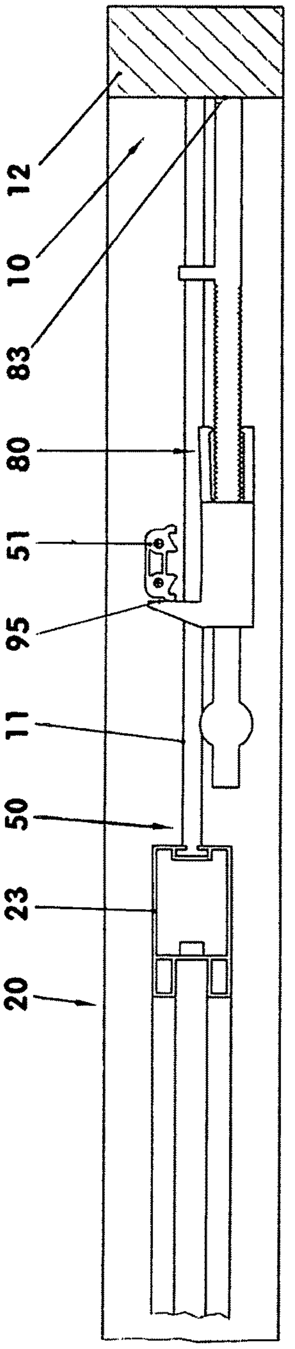
FIG. 2: a sliding door frame with a carrier and an installation adjustment device.

FIG. 1 shows a bottom view of a sliding door 20 shortly before its installation into a door frame 10, see FIG. 2. The sliding door 20 comprises a sliding door frame 21 which may consist for example of several parts. In the representation of FIG. 1, the sliding door frame 21 has a horizontal frame part 22 and a vertical frame part 23 connected to the horizontal frame part 22. The horizontal frame part 22 has a recess 24 in which a lower door fitting 40 is arranged. The lower door fitting 40 comprises a base component 41 and for example a height adjustment member which is adjustable relative to the base part 41. The height adjustment is achieved by means of an adjustment arrangement 42 which is supported for example by a vertical frame part 23. It is also possible to design the lower door fixture 40 such that the adjustment arrangement 42 abuts the lower base part 41.

The lower door fitting 40 includes a support roller 43. In the longitudinal direction 25 of the sliding door 20 ahead of, and behind, the support roller 43 cleaning brushes 44 are arranged. In the lower door fitting 40, furthermore an acceleration and deceleration device 45 is arranged. It comprises a carrier element 46 which is movable between a force- and/or form locking fixed park position and an end position. The carrier element 46 is connected to an acceleration arrangement and, parallel therewith, a deceleration arrangement. During movement of the carrier element 46, the force resulting from combined forces of the acceleration arrangement and the deceleration arrangement is effective on the carrier element 46. After release from the fixed park position, in the exemplary embodiment, the movement of the carrier element 46 is continued by a spring energy store being discharged while being slowed down by a cylinder-piston unit.

For example, during closing of the sliding door 20 before the sliding door 20 reaches the closed end position, the carrier element 46 comes into contact with a stationary carrier 51, see FIG. 2. The carrier 51 is arranged for example at the inner side of the sliding door 20 within a closet next to a guide track 11 for the support roller 43. The carrier 51 of the auto-return arrangement 50 releases the carrier element 46 from the park position. The sliding door 20 is now moved into the closed end position where it comes to a standstill without shock.

In the representation of FIG. 1, an installation assisting device 80 is shown adjacent the sliding door 20. In the representation of FIG. 2, the installation assisting device 80 is disposed between the vertical door frame part 12 and the carrier 51.

The assembly assisting device 80 comprises a support rod 81 and a slide 91 which is movable along the support rod 81. The support rod 81 consists in the exemplary embodiment of a plastic material and has an essentially rectangular cross-section. One of the front surfaces which extend normal to the longitudinal direction 85 of the assembly assisting device 80 serves as stop surface 83. For example, at a distance from the stop surface 83, the support rod 81 is provided with a transverse stub 86 having a test surface 87. The transverse stub 86 projects in the exemplary embodiment normally from the narrow side 84 of the support rod 81. The projection length of the transverse stub 86 corresponds for example to one and a half times the width of the support rod 81. The distance of the stop surface 83 from the test surface 87, which extends parallel to the stop surface 83, is in the exemplary embodiment 67 millimeter. The vectors oriented normal with regard to the stop surface 83 and the test surface 87 point in the same direction.

At its narrow sides 84, the support rod 81 is provided with a plurality of stop notches 88. The notches formed in the two narrow sides 84 are displaced relative to one another. The individual notches 88 may be provided on the support rod 81 with markings.

The slide 91 extends around the support rod 81 to some extent. Its length is for example eight times the width of the support rod 81. The slide has two slide tongues 92 adjacent the two narrow sides 84 of the support rod 81. Both slide tongues 92 are flexible. They are provided with engagement tips 93 projecting toward the support rod 81.

The slide 91 is provided with an adjustment wedge 94 which projects from one side of the slide. The adjustment wedge 94 is oriented in the same direction as the transverse stub 86. The length of the projecting area corresponds for example to twice the width of the support rod 81. The adjustment wedge 94 includes an adjustment surface 95 which is oriented normal to the longitudinal direction 85 of the assembly assisting device 80. The vectors normal to the adjustment surface 95 and to the stop surface 83 extend parallel and point in the same direction.

Before the installation of the sliding door 20 in the door frame part 10, the position of the carrier element 46 relative to the door front surface 26 is determined by means of the assembly assisting device 80. In this step, the test surface 87 is brought into contact with the carrier element 46 when in the park position. Then the slide 91 is moved relative to the support part 81 until the adjustment surface 95 abuts the door front surface 26 of the sliding door 20. The adjustment surface 95 then abuts the vertical profile element 23. One of the engagement tips 93 of the slide 91 is then engaged in a stop notch 88 of the support rod 81. Depending on the design of the sliding door 20, the length of the vertical profile element 21 in the longitudinal direction may be different from that of other doors. With the same door fitting 40, then also the distance between the adjustment surface 95 and the test surface of the transverse stub 86 changes with the length of the vertical profile element 23 measured in the longitudinal direction.

Before or after the installation of the sliding door 20 into the door frame member 10, the position of the carrier 51 is adjusted. To this end, the installation assisting device 80 as adjusted in the previous step is placed onto the guide track 11 so that the stop surface 83 abuts the vertical door frame member 12. The lower carrier 51 is now so arranged that it abuts the adjustment surface 95. In this position, the carrier can be fixed.

Figure 3:
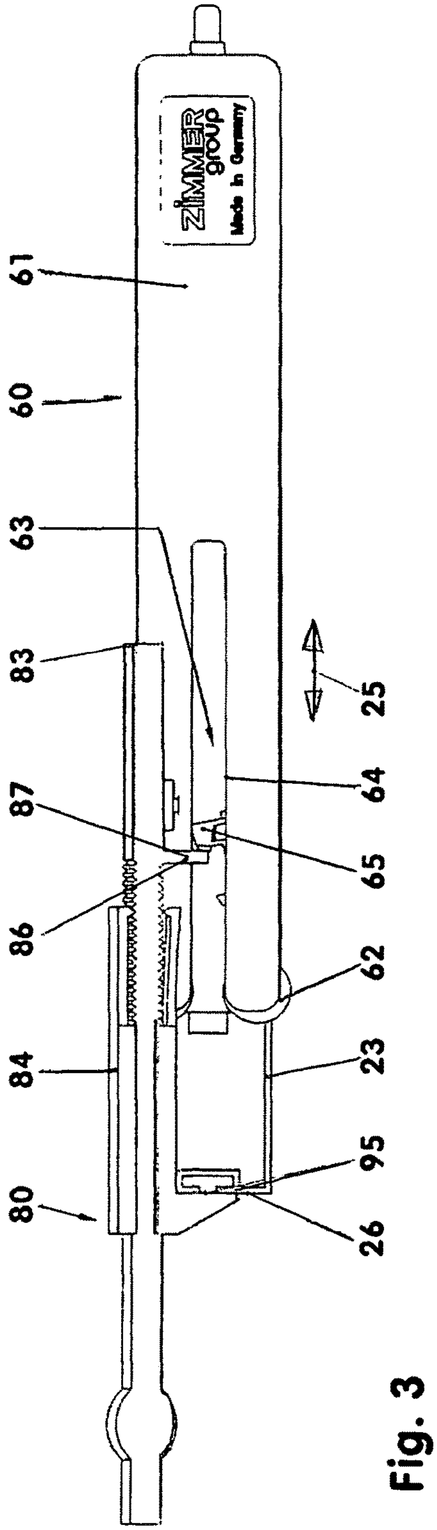
FIG. 3: a sliding door arrangement with an upper acceleration and deceleration device and an installation adjustment device.

The sliding door 20 as shown in FIG. 3 has an upper door fitting 60, which may be arranged on the sliding door 20 in addition to the lower door fitting 40 shown in FIG. 1. The upper door fitting 60 has a base body 61 in which two transverse guide rollers 62 and a combined acceleration and deceleration device 63 are supported. The transverse guide rollers 62 are oriented toward the door front surface 26 of the sliding door 20. They are arranged transverse to the longitudinal direction 25 above the base body 61. Between the two transverse guide rollers 62, the base body 61 has a guide-in opening 64. In this guide-in opening 64, a carrier element 65 of the acceleration and deceleration device 63 is arranged. The latter is of the same design as the acceleration and deceleration device 45 described in connection with the lower door fitting 40.

Figure 4:
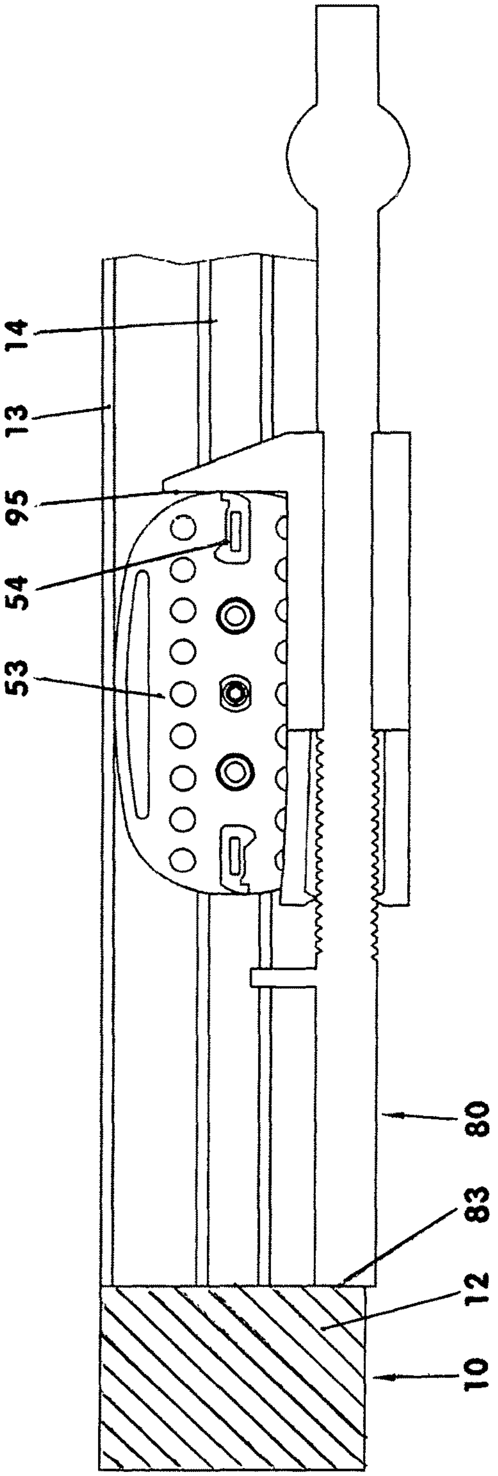
FIG. 4: an upper carrier and installation adjustment device.

FIG. 4 shows an upper door guide track 13 with an actuator 53 arranged therein. The actuator 53 has two carriers 54 which are arranged displaced relative to each other in the longitudinal direction 25.

In FIG. 3 as well as in FIG. 4, for example the same installation assisting device 80 is shown. The installation assisting device 80 is of the same design as the installation assisting device shown in FIGS. 1 and 2. The distance between the test surface 87 and the stop surface 83 is for example 50 millimeter.

The positioning of the upper actuator 53 in this exemplary embodiment occurs in the same way as the lower carrier 51. After placement of the test surface 87 on the carrier element 65, the slide 91 is so adjusted that the adjustment surface abuts the door front surface 26. With the installation assisting device 80 so adjusted it is placed with the stop surface 83 into contact with the vertical door frame member 12. Now the actuator 53 is moved for example in a longitudinal guide structure 14 of the upper door guide track 13 until it abuts the adjustment surface 95. In this position, the actuator can be fixed.

With the upper auto-return arrangement 50, the actuator 53 can be position-adjusted before or after installation of the sliding door 20 in the door frame member 10.

Figure 5:
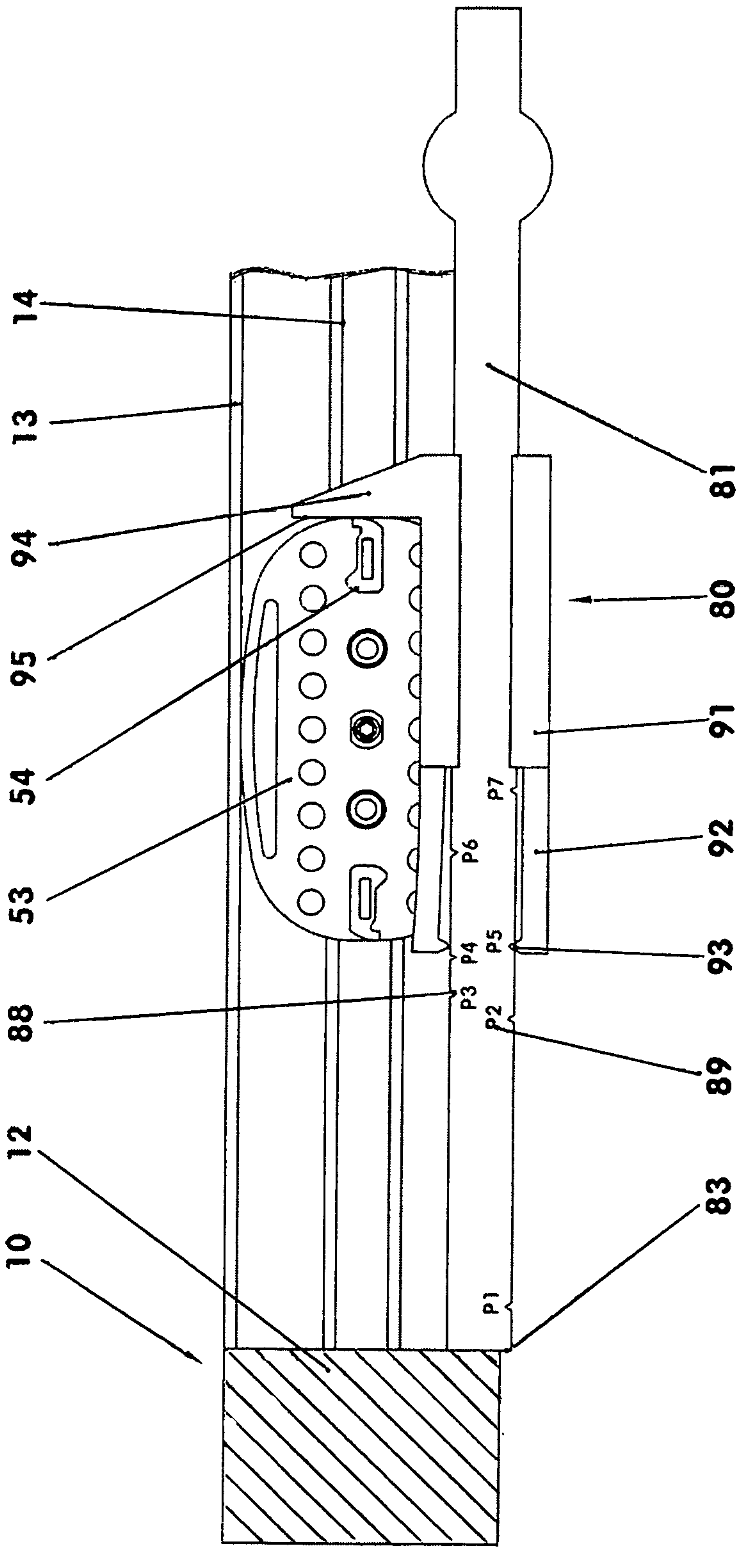
FIG. 5: an alternative design of an installation adjustment device.

FIG. 5 shows a variant of an installation assisting device 80. This installation assisting device 80 is of a design corresponding largely to the installation assisting devices 80 shown in FIGS. 1-4. However, instead of a test surface 87, it has a transverse stub 86. The stop engagement notches 88 are marked with markings 89. In the exemplary embodiment, each marking 89 refers to one of the different forms of the vertical profile elements 23.

In order to position, the actuator 53 for example the slide 91 is adjusted relative to the support part 81 so that an engagement tip 93 is engaged in that notch 88, which is marked for the particular vertical profile element 23. After abutment of the stop surface 83 on the vertical door frame member 12, the actuator is moved so as to abut the adjustment surface 95. At this point, the actuator can be fixed.

Upon closing or upon opening the sliding door 20, the stationary carriers 51, 54 come into contact with the carrier elements 46, 65 and release them from the arrest position. The sliding door is braked down and is moved slowly into the closed or the open end position. Here, it comes to a standstill without any contact noise.

Also, combinations of the individual various exemplary embodiments are possible.

NUMERAL REFERENCE NUMBERS

| | |
|---|---|
| 10 | Door frame member |
| 11 | Guide track |
| 12 | Vertical door frame member |
| 13 | Upper door guide track |
| 14 | Longitudinal guide structure |
| 20 | Sliding door |
| 21 | Sliding door frame |
| 22 | Horizontal frame part |
| 23 | Vertical frame part |
| 24 | Recess |
| 25 | Longitudinal direction |
| 26 | Door front surfaces |
| 40 | Lower door fitting |
| 41 | Base component |
| 42 | Adjustment arrangement |
| 43 | Support roller |
| 44 | Cleaning brushes |
| 45 | Acceleration and deceleration device |
| 46 | Carrier element |
| 50 | Auto-return arrangement |
| 51 | Carrier, bottom |
| 53 | Actuator |
| 54 | Carrier |
| 60 | Upper door fitting |
| 61 | Base body |
| 62 | Transverse guide roller |
| 63 | Acceleration and deceleration device |
| 64 | Intake opening |
| 65 | Carrier element |
| 80 | Installation adjustment device |
| 81 | Support rod |
| 83 | Stop surface |
| 84 | Narrow side |
| 85 | Longitudinal direction |
| 86 | Transverse stub |
| 87 | Test surface |
| 88 | Notches |
| 89 | Markings |
| 91 | Slide |
| 92 | Slide tongue |
| 93 | Engagement tips |
| 94 | Adjustment wedge |
| 95 | Adjustment surface |

What is claimed is:

1. An installation adjustment device (80) for an auto-return arrangement (50), comprising a support rod (81) with a front stop surface and an adjustable slide (91) which is slidably supported on the support rod (81) so as to be stepwise position adjustable thereon, the adjustable slide (91) having an adjustment surface (95) which extends parallel to a stop surface (83) and the normal vectors on the stop surface (83) and the adjustment surface (95) having the same direction, the support rod (81) including a transverse stub (86) provided with a test surface (87).

2. The installation adjustment device (80) according to claim 1, wherein the slide (91) is adjustable in the longitudinal direction (85) of the support rod (81).

3. The installation adjustment device (80) according to claim 1, wherein the support rod (81) is provided at its narrow sides (84), which extend normal to the stop surface (83), with stop notches (88).

4. The installation adjustment device (80) according to claim 1, wherein the slide (91) includes two slide tongues (92).

5. The installation adjustment device (80) according to claim 4, wherein the slide tongues (92) are provided with engagement tips (93) for engagement stop notches (88) formed in the support rod (81).

6. An installation adjustment device (80) for an auto-return arrangement (50), comprising a support rod (81) with a front stop surface and an adjustable slide (91) which is slidably supported on the support rod (81) so as to be stepwise position adjustable thereon, the adjustable slide (91) having an adjustment surface (95) which extends parallel to a stop surface (83) and the normal vectors on the stop surface (83) and the adjustment surface (95) having the same direction, the support rod (81) being further provided at its narrow sides (84), which extend normal to the stop surface (83), with stop notches (88) and the slide (95) including at opposite sides of the support rod slide tongues (92) with engagement tips (93) for engagement with the stop notches (88) provided at the narrow sides (84) of the support rod (81) and marked with markings (89).

* * * * *